(12) United States Patent
Oswald

(10) Patent No.: US 8,149,448 B2
(45) Date of Patent: Apr. 3, 2012

(54) SYSTEMS AND METHODS FOR RAPIDLY CREATING AN IMAGE FROM A DOCUMENT

(75) Inventor: Tommy L. Oswald, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1100 days.

(21) Appl. No.: 11/216,893

(22) Filed: Aug. 31, 2005

(65) Prior Publication Data

US 2007/0046968 A1    Mar. 1, 2007

(51) Int. Cl.
*G06K 15/00*    (2006.01)
(52) U.S. Cl. .................................... 358/1.16; 358/1.17
(58) Field of Classification Search ......... 358/1.11–1.18
See application file for complete search history.

(56) References Cited

U.S. PATENT DOCUMENTS

| | | | | |
|---|---|---|---|---|
| 5,727,220 | A * | 3/1998 | Hohensee et al. | 715/234 |
| 6,104,498 | A * | 8/2000 | Shima et al. | 358/1.14 |
| 6,594,031 | B1 * | 7/2003 | Taima | 358/1.15 |
| 7,054,899 | B1 * | 5/2006 | Yamamoto | 709/202 |
| 2002/0097433 | A1 * | 7/2002 | Chang et al. | 358/1.15 |
| 2003/0179400 | A1 | 9/2003 | Kofman et al. | |
| 2003/0184799 | A1 * | 10/2003 | Ferlitsch | 358/1.15 |
| 2004/0184072 | A1 * | 9/2004 | Jacobsen et al. | 358/1.15 |

FOREIGN PATENT DOCUMENTS

| | | |
|---|---|---|
| EP | 1 077 402 | 2/2001 |
| JP | 2001-056756 | 2/2001 |
| JP | 2001-058429 | 3/2001 |
| JP | 2001-243028 | 9/2001 |
| JP | 2001-290616 | 10/2001 |
| JP | 2003-157156 | 5/2003 |
| JP | 2005-212250 | 8/2005 |

* cited by examiner

*Primary Examiner* — Twyler Haskins
*Assistant Examiner* — Fred Guillermety
(74) *Attorney, Agent, or Firm* — Austin Rapp & Hardman

(57) ABSTRACT

A method of rapidly creating an image from a document is disclosed. Image data derived from a document is received at an imaging device. It is then determined whether the image data is in an image-ready format that can be directly processed by a marking engine. If the image data is in an image-ready format, it is transmitted to the marking engine to create an image. If it is not in an image-ready format, the image data is converted to a proper format. The image data is transmitted to the marking engine. If the image data is spooled to a nonvolatile storage device, the spooling takes place only after or concurrent with transmission of the image data to the marking engine such that creation of the image is not delayed by this spooling process.

22 Claims, 8 Drawing Sheets

SYSTEMS AND METHODS FOR RAPIDLY CREATING AN IMAGE FROM A DOCUMENT

TECHNICAL FIELD

The present invention relates generally to computers and computer-related technology. More specifically, the present invention relates to systems and methods for rapidly creating an image from a document.

BACKGROUND

Imaging devices are frequently used in many aspects of business, industry and academic endeavors. The term "imaging," as used herein, should be interpreted broadly to include any process for producing a copy of a document onto paper, a computer screen, an electronic image, or the like. Examples of imaging devices include printers, facsimile devices, copiers, scanners, display monitors, multi-function peripherals (MFPs), imagesetters, platesetters, filing devices, web publishing devices, and so forth. Documents that are sent to a printing device for printing are sometimes referred to as "print jobs."

Printers (one kind of imaging device) are used with computers to print various kinds of items, including letters, documents, pictures, etc. Many different kinds of printers are commercially available. Ink jet printers and laser printers are fairly common among computer users. Ink jet printers propel droplets of ink directly onto the paper. Laser printers use a laser to print. Many imaging devices can generate scanned image data. For example, some imaging devices include scanners which can scan a document to provide scanned image data. It is also possible that an imaging device may be able to read scanned image data from a storage device. There may also be other ways in which an imaging device may be provided with or otherwise obtain scanned image data. Copiers and facsimile devices are also commonly used imaging devices.

One characteristic of imaging devices is the ability to generate the specified image. However, processing, transmitting, and storing image data to create an image can be a time-consuming process and can significantly delay generation of the image. Persons using an imaging device can become frustrated if the processing time is slow. For example, if the first page of an imaged document is delayed, the person who initiated the imaging process may wonder whether the image data has been lost in transit or whether a network over which the image data was transmitted is not functioning properly.

Accordingly, benefits may be realized by improved systems and methods for rapidly generating an image from a document. Some exemplary systems and methods for rapidly generating an image from a document are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
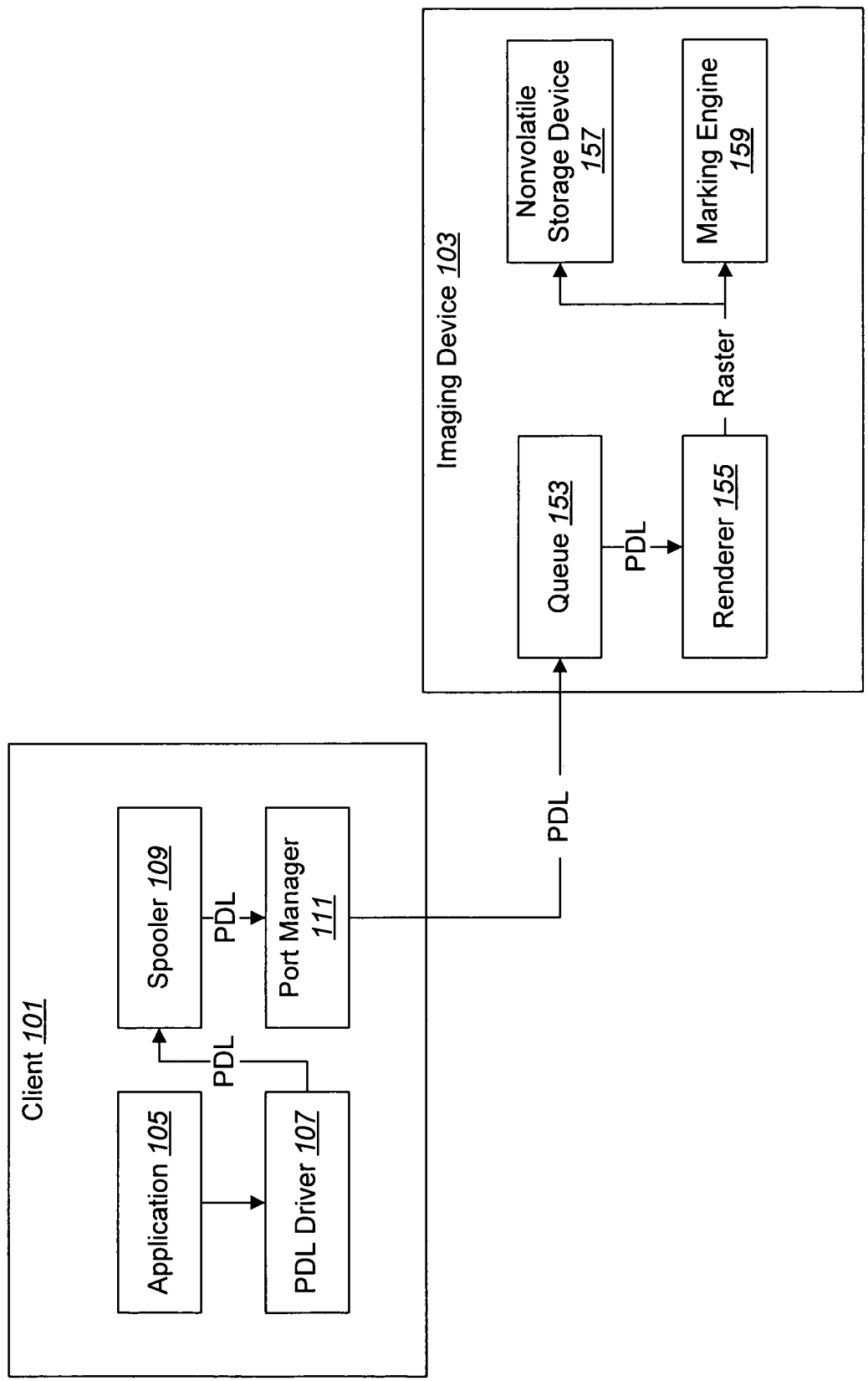
FIG. 1 is a block diagram of one embodiment of a client machine and an imaging device in which image data in a page description language (PDL) format is transmitted to the imaging device to create an image.

A method for creating an image from a document is disclosed. Image data derived from a document is received at an imaging device. It is then determined whether the image data is in an image-ready format that can be directly processed by a marking engine. If the image data is not in an image-ready format, the image data is converted to an image-ready format. The image data is transmitted in an image-ready format to the marking engine, which is within the imaging device, for creation of an image. If the image data is spooled to a nonvolatile storage device, the image data is transmitted to the marking engine before or concurrent with spooling the image data to the nonvolatile storage device. Thereafter, the image data may be spooled on a nonvolatile or other type of storage device.

In one embodiment, the image data is stored in a queue comprising volatile memory following receipt of the image data at the imaging device. The image data processed by the imaging device may be in various formats. In one configuration, the image-ready format is a rasterized format, and a page description language (PDL) format, such as the postscript format, is not an image-ready format, but must be converted before processing by the marking engine. Rasterized data received at the imaging device may be produced by a raster image processor (RIP) server.

An imaging device configured to implement the above-noted method is also disclosed. The imaging device may include processor, and memory, a nonvolatile storage device (such as a hard disk storage device), and a marking engine in communication with the processor. Instructions are stored in the memory for executing the method described above.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram of one embodiment of a client device 101 and an imaging device 103 in which image data in a PDL format is transmitted to the imaging device 103. The client 101 may comprise any type of computing device that has the capability of generating image data that may be printed or otherwise imaged by an imaging device 103. The client 101, for example, could comprise a desktop computer system or a personal data assistant (PDA) with printing capabilities.

The client 101 illustrated in FIG. 1 includes an application 105 that may be used to view, print, or otherwise manipulate a document. The application 105 could be, for example, Microsoft Word produced by Microsoft Corporation of Redmond, Wash. or Netscape Browser produced by Netscape Communications Corporation of Mountain View, Calif. A document is a compilation of data, such as a word processing document or a web page, from which an image may be created. The document that also comprise a physical document that is scanned to generate image data therefrom.

A user of the client 101 may provide user input via, for example, a mouse or keyboard to the application 105 to initiate the imaging process. A page description language (PDL) driver 107 is then used to convert the identified document into image data of a particular format. Image data is any type of data or information that may be used directly or through a conversion process to produce an image.

As illustrated in FIG. 1, the PDL driver 107 generates image data in a PDL format. The term "page description language," or PDL, refers to a high-level language for commanding an imaging device 103 to print (or image) text and/or graphics. PDL may be device independent. Two common PDLs are "Postscript" by Adobe Systems Incorporated of San Jose, Calif. and printer control language (PCL) by Hewlett-Packard Company of Palo Alto, Calif.

Following receipt of the image data by the imaging device 103, the image data is stored in a spooler 109 (e.g., using volatile memory, such as random access memory (RAM), or a nonvolatile storage device, such as a hard disk storage device). The spooler 109 may be used to store the image data until the imaging device 103 is prepared to process the image data stored therein. After the image data passes through the spooler 109, the port manager 111 controls the transmission of the image data from the client 101 to the imaging device 103.

The client 101 described above is merely exemplary. The imaging devices 103 disclosed herein may be used in connection with many different types of clients 101. Regardless of the embodiment of the client 101, the client 101 is capable of generating image data of a format that may be processed by the imaging device 103 or be converted to a format that may be processed by the imaging device 103.

The client 101 and imaging device 103 may be placed in electronic communication in various ways. For example, a parallel connection, network connection, or universal serial bus (USB) connection may be used to enable electronic communication between the client 101 and the imaging device 103.

The imaging device 103 depicted in FIG. 1, includes four principal components: a queue 153, a renderer 155, a nonvolatile storage device 157, and a marking engine 159. Of course, other components are or may be present in the imaging device 103. However, for simplicity, only the four components noted above are described in detail.

The queue 153 is configured to receive image data of various formats and store the image data until the renderer 155 is ready to receive the stored image data. The queue 153 may include any type of volatile storage medium, such as random access memory (RAM). The queue 153 may use various techniques for determining the priority for transmitting image data from the queue 153 to the renderer 155, such as first-in, first-out (FIFO).

The renderer 155 converts the image data from one of various formats into image data of a rasterized format. The image data in a rasterized format may be processed directly by the marking engine 159 of the imaging device 103.

Rasterization is the process of converting text and images into a matrix of pixels (i.e., a bitmap image). Rasterization may involve a number of different conversion processes. For example, the bitmap coordinates of vector and outlined fonts as well as vector drawings may be converted into bitmaps in various stages.

With respect to the imaging device 103 depicted in FIG. 1, the rasterized format is an "image-ready format," i.e., a format that can be directly processed by the marking engine 159. If the image data is an image-ready format no conversion of the image data is required before the image data received and processed by the marking engine 159 to create an image. The PDL format, in the present illustration, is not an image-ready format. Accordingly, in the present illustration, a renderer 155 is required to convert the image data in a PDL format into an image-ready format.

Following rasterization of the image data, the image data in rasterized format is transferred to a marking engine 159. The marking engine 159 creates an image based on the received image data. Using the marking engine 159, the specified image may be printed on paper, shown on a display device, or stored on a disk (e.g., a compact disk (CD)).

The marking engine 159 may be embodied in a number of different ways. The marking engine 159 could include, for example, components for printing to paper using ink jet, thermal dye sublimation, or laser technologies. Alternatively, the marking engine 159 could comprise portions of a CRT or LCD display screen that display rather than process the specified image or components for storing an image on a disk.

In one embodiment, concurrent with or following transmission of the image data in a rasterized format to the marking engine 159, the rasterized data is spooled to, or stored on, a nonvolatile storage device 157, such as a hard disk storage device. Because the image data is transmitted to the marking engine 159 concurrent with or prior to storing the image data, the initiation of the marking process, in contrast to prior art devices, is not delayed during the read/write process of the nonvolatile storage device 157.

In prior art embodiments of imaging devices, image data in various formats is stored in a hard disk storage device, which serves as a spooler. The image data is not processed by the marking engine until after the image data has been stored on and retrieved from the hard disk storage device. Because of the relatively slow read/write speed of hard disk storage devices (particularly, when compared to RAM as is typically found in the queue), the imaging process is quite slow. In such embodiments, the printing of the first page is particularly delayed while this read/write process occurs. In contrast, the imaging device 103 disclosed herein immediately begins to rasterize the received image data, causing the imaging of the first page of a document to occur much more rapidly.

Figure 2:
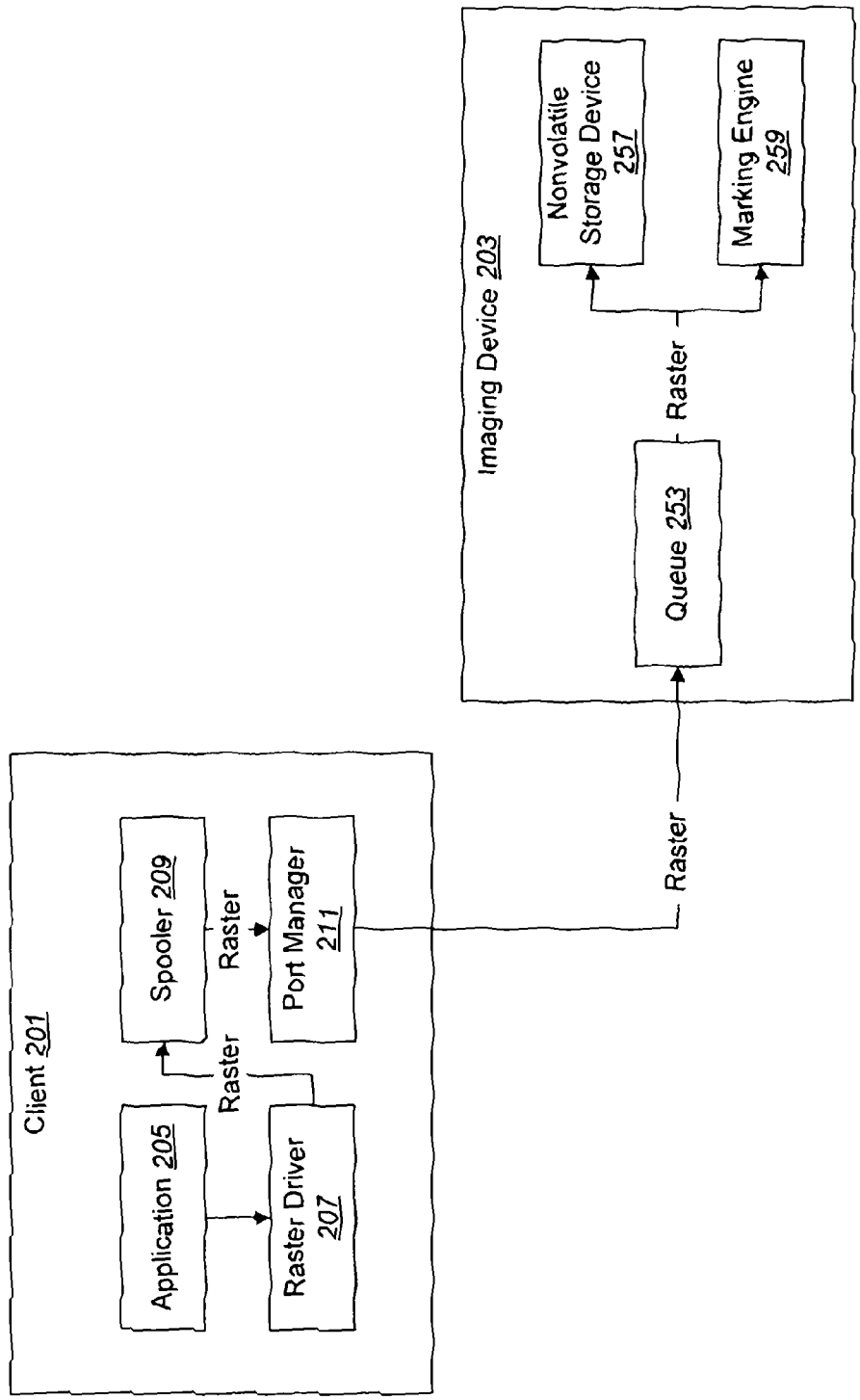
FIG. 2 is a block diagram illustrating one embodiment of a client machine and an imaging device in which image data in an image-ready format (e.g., a rasterized format) is transmitted to the imaging device.

FIG. 2 is a block diagram illustrating one embodiment of a client machine 201 and an imaging device 203 in which image data in a rasterized format is transmitted to the imaging device 203. As with the embodiment disclosed in connection with FIG. 1, the client 201 may be embodied in a wide variety of different configurations. In either case, the client 201 is capable of generating image data from a document. In the illustrated embodiment of the imaging device 203, the rasterized format is an image-ready format that can be directly processed by the marking engine 259.

In the client 201 disclosed in FIG. 2, an application 205 interacts with a raster driver 207 to generate image data in a rasterized format. The image data in a rasterized format is stored in a spooler 209 and then transmitted using a port manager 211 to the imaging device 203.

The imaging device 203 of FIG. 2, receives the image data in a rasterized format at the queue 253. (Contrast this with the imaging device 103 of FIG. 1 in which the image data is received at the imaging device 103 before rasterization.) As with the queue 113 of the imaging device 103 disclosed in connection with FIG. 1, the queue 253 shown in FIG. 2 includes volatile memory, such as RAM. Again, volatile memory has a much faster read/write speed than a nonvolatile storage device 257 (e.g., a hard disk storage device or flash memory). Thus, the image data may be rapidly written to and read from the queue 253.

Thereafter, the image data in a rasterized format is transmitted to the marking engine 259 for creation of an image, as explained in connection with FIG. 1. Once again, the image data in a rasterized format (either after or concurrent with transmission of the image data to the marking engine 259) is optionally spooled to, or stored on, a nonvolatile storage device 257. Accordingly, the process of writing to and reading from the nonvolatile storage device 257 does not delay the imaging process.

Figure 3:
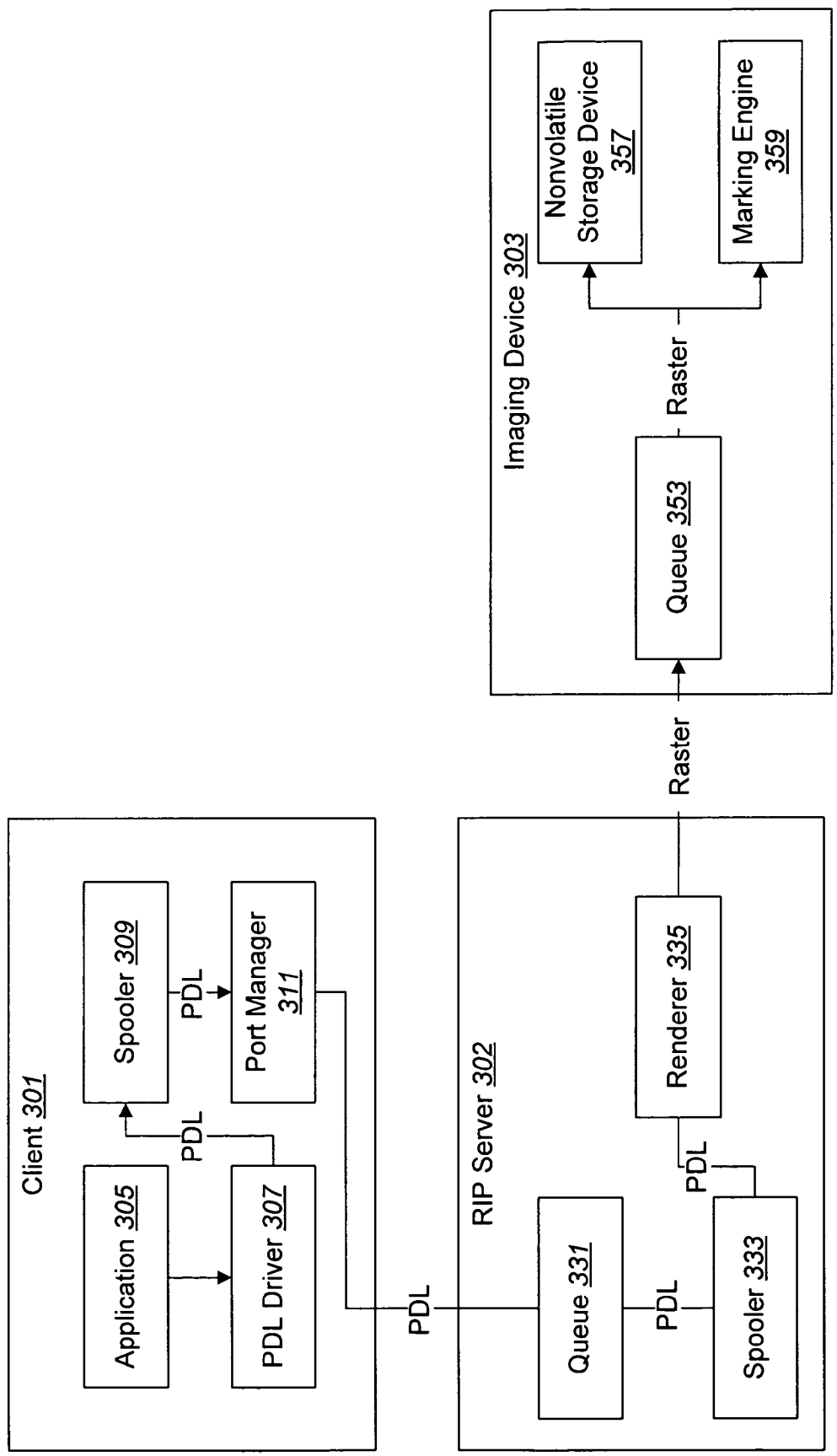
FIG. 3 is a block diagram illustrating one embodiment of a client machine, a raster image processor (RIP) server, and an imaging device in which image data in an image-ready format is transmitted to an imaging device.

FIG. 3 is a block diagram illustrating one embodiment of a client machine 301, a raster image processor (RIP) server 302, and an imaging device 303 in which image data in a rasterized format is transmitted to the imaging device 303. As with the embodiment disclosed in connection with FIGS. 1 and 2, the client 301 may be embodied in a wide variety of different configurations. In each embodiment of the client 301, the client 301 is capable of generating image data from a document. As with the embodiments described in connection with FIGS. 1 and 2, the rasterized format is in image-ready format, while the PDL format is not in image-ready format.

The client 301 disclosed in FIG. 3 functions in the same way as the client 101 of FIG. 1. In particular, the client 301 generates image data in a PDL format using an application 305, PDL driver 307, spooler 309, and port manager 311.

The image data in a PDL format is then transferred to the RIP server 302. The RIP server 302 generates image data in a rasterized format for processing by the imaging device 303. The RIP server 302 may receive image data from numerous different devices via, for example, a computer network.

Within the RIP server 302, the image data is received and then stored in a queue 331. The queue 331 of the RIP server 302 may use volatile memory, a nonvolatile storage device, or a combination of both. After passing through the queue 331, the image data is then transferred to the spooler 333, which typically includes volatile memory or a nonvolatile storage device. The image data is stored in the spooler 333 until the renderer 335 is available to process the image data. Thereafter, the renderer 335 converts the image data into a rasterized format.

The image data in a rasterized format is then transmitted to the imaging device 303. The imaging device of FIG. 3 is similar in configuration to the imaging device of FIG. 2. In particular, both of these imaging devices 203, 303 process image data that was rasterized at a device external to the imaging device 203, 303. As indicated above, the image data in a rasterized format moves from the queue 353 into the marking engine 359 for imaging and concurrently or thereafter is spooled to, or stored on, a nonvolatile storage device 357. Again, this procedure enables the imaging process to begin more rapidly than prior art embodiments.

The embodiments disclosed in FIGS. 1-3 are merely exemplary. The systems and methods disclosed herein may be used in connection with a wide variety of different imaging devices 303. For example, in one embodiment, the image data may include both rasterized and non-rasterized portions. The imaging device 303 may determine whether the received image data, or portions thereof, have already been rasterized and process the image data accordingly. Again, in such a case, the image data in a rasterized format will be transmitted to the marking engine 359 concurrent with or before spooling the image data to a nonvolatile storage device 357. In addition, it should be noted that the imaging devices 303 disclosed herein are not limited to the processing of image data of any particular type or format but may be implemented in connection with image data of numerous different formats.

Figure 4:
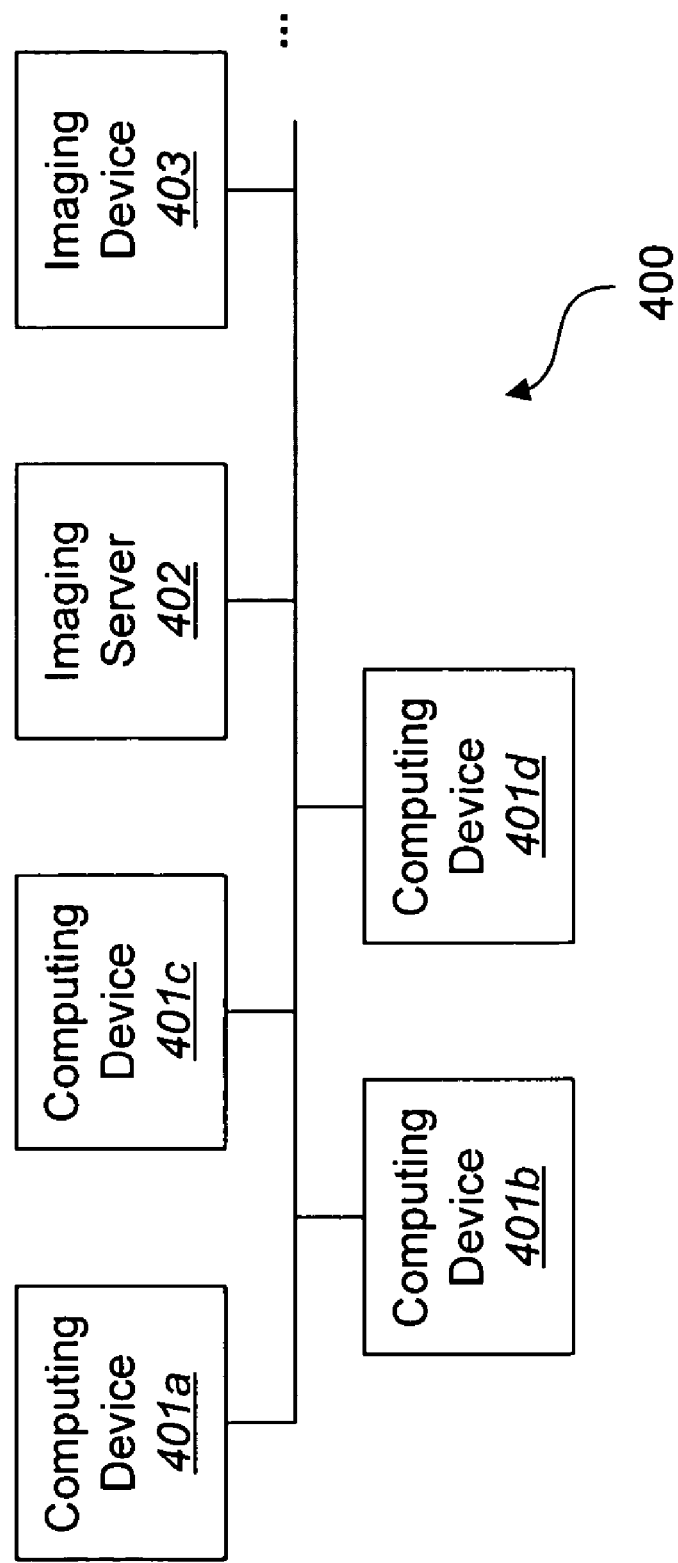
FIG. 4 is a network block diagram illustrating one possible environment in which the systems and methods disclosed herein may be implemented.

FIG. 4 is a network block diagram illustrating one possible environment in which the present systems and methods may be implemented. In particular, FIG. 4 illustrates a computer network 400 comprising a plurality of computing devices 401, an imaging server 402 (e.g., a RIP server), and an imaging device 403. Of course, the imaging device 403 disclosed herein is not necessarily used in a network environment but may be implemented, for example, through a direct parallel, serial, or USB connection to a computing device.

In the disclosed embodiment, image data may be generated by any one of the computing devices 401 and may be transmitted directly to the imaging device 403. Alternatively, the computing device 401, or client 401, may transmit image data to the imaging server 402 for processing before the image data is forwarded to the imaging device 403. Each of the computing devices 401 and the imaging server 402 may be used to generate, process, and store image data.

Embodiments herein are independent of the job control command and image data language and syntax. For example, the job control language may be PJL and the image data may be in a PCL, Postscript, or a rasterized (bitmap) format.

Imaging devices disclosed herein may include software, firmware, hardware and other forms that achieve the function described herein. The embodiments may be adapted to many environments with varying computing devices 401, operating systems, printing devices, network hardware and software, applications and other variables.

The embodiments disclosed operate independently of how the imaging job is initiated. For example, an imaging job may be initiated by an application using a computing device 401 or may be initiated from the imaging device 403 itself, such as by initiating a scanning job to create an image.

The term "network" 400 may refer to any combination of computing devices 401 and peripherals, such as imaging devices 403, wherein the devices can communicate with each other. The term "network" 400 may comprise local area networks (LANs), storage area networks (SANs), metropolitan area networks (MANs), wide area networks (WANs), and combinations thereof (e.g., the Internet) with no requirement that the client 401, imaging device 403, and server 402 reside in the same physical location, the same network 400 segment, or even in the same physical network 400. A network 400 may be internally interconnected or connected with other networks using conventional conductive cable, fiber-optic cable, phone line cable, power line cable or other electrical and light conductors and other signal transmission media as well as wireless connections using infrared, RF or other wireless methods, or combinations of the foregoing.

Figure 5:
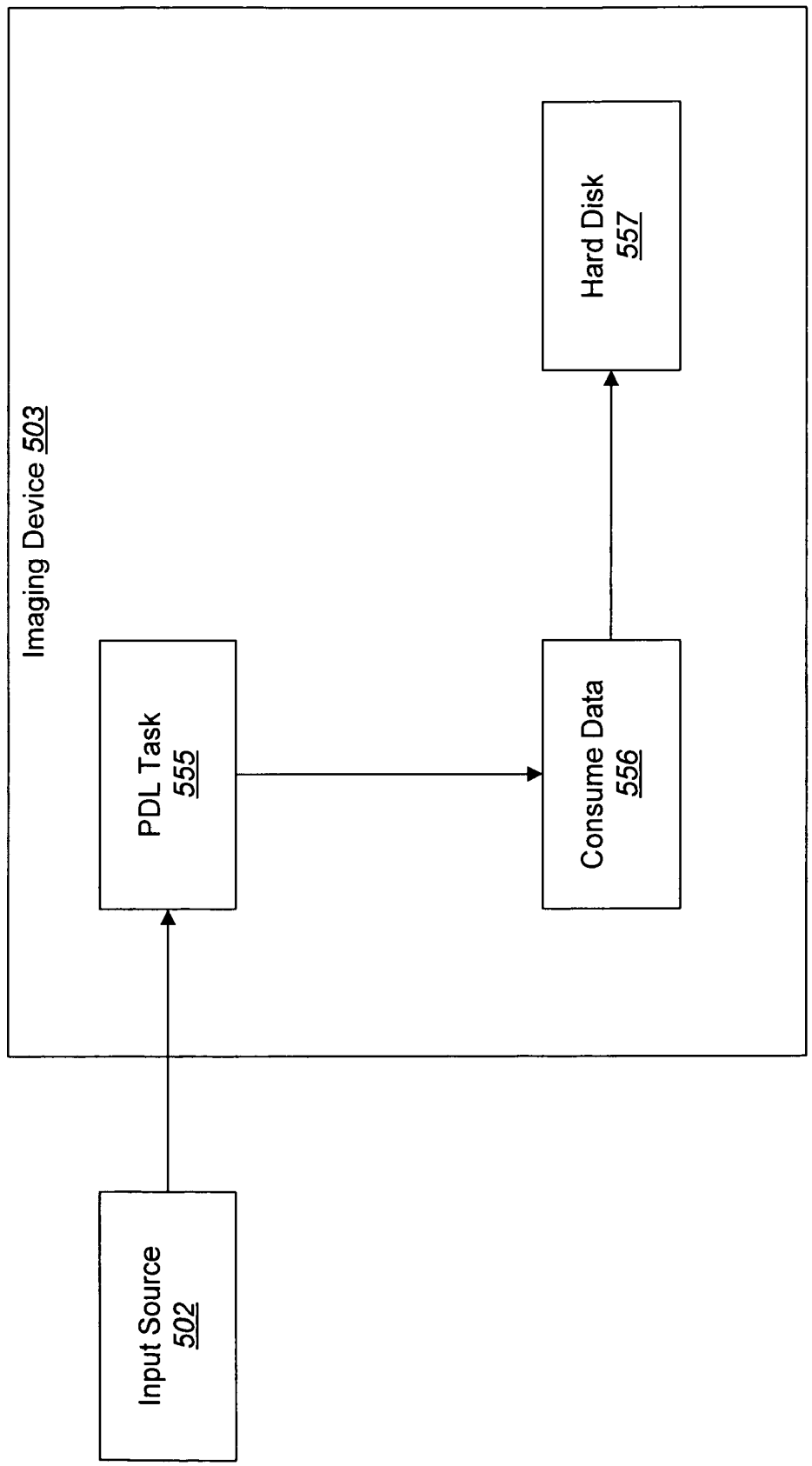
FIG. 5 is a block diagram illustrating an input source and an embodiment of an imaging device.

FIG. 5 is a block diagram illustrating an input source 502 and an embodiment of an imaging device 503. The input source generates image data that is received by the imaging device 503. The image data may be in various formats, such as a PDL or rasterized format or a combination thereof. In the embodiment illustrated in FIG. 5, the image data is in a PDL format.

The image data in a PDL format is then transmitted to the imaging device 503. The image data is then processed within the component referred to as the "PDL task" component 555. This processing component 555 converts the image data into a format (e.g., a rasterized format) that may be directly used to create an image (i.e., an image-ready format).

The image data is then consumed 556 (i.e., transmitted to create an image by a marking engine or the like). After the image data is consumed, the image data is spooled, or stored, on a hard disk storage device 557. As noted with other embodiments of the imaging device (e.g., 303 of FIG. 3), spooling to a nonvolatile storage device (e.g., 357 of FIG. 3) does not occur before the image data is transmitted to the marking engine such that the imaging process is initiated more rapidly.

Figure 6:
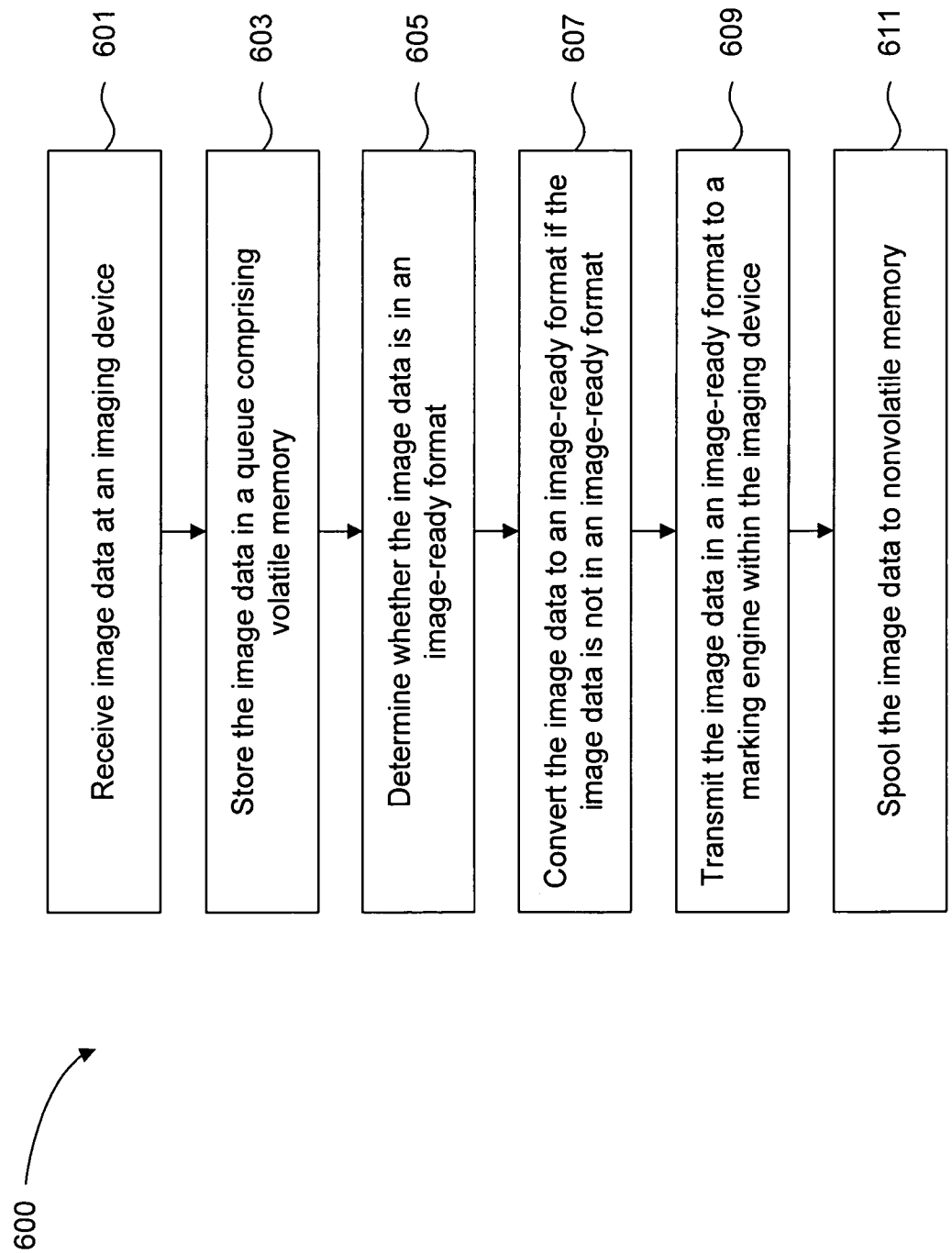
FIG. 6 is a flow diagram illustrating one embodiment of a method for rapidly producing an image from a document.

FIG. 6 is a flow diagram 600 illustrating one embodiment of a method for rapidly producing an image from a document. Image data, which may be embodied in various formats as discussed above, is received 601 at an imaging device. The image data is derived from a document. The document may be a data compilation or file of any type or a physical document that has been, for example, scanned.

The image data may then be stored 603 in a queue that comprises volatile memory, such as RAM. The volatile memory has a rapid read/write time enabling the data to be quickly stored and read with minimal delay in the imaging process.

It is then determined 605 whether the image data is in a rasterized format, or another image-ready format, that is directly readable by the marking engine. If the image data is not yet in an image-ready format, the image data is then converted 607 to an appropriate format.

Thereafter, the image data is transmitted 609 to a marking engine for creation of an image, such as on a printed page, on a display screen, or on a disk. This transmission occurs before or concurrent with spooling 611, or storing, the image data to a nonvolatile storage device. The marking of the image occurs much more rapidly than in prior art embodiments because the imaging process is not delayed while the image data is spooled to a nonvolatile storage device.

Figure 7:
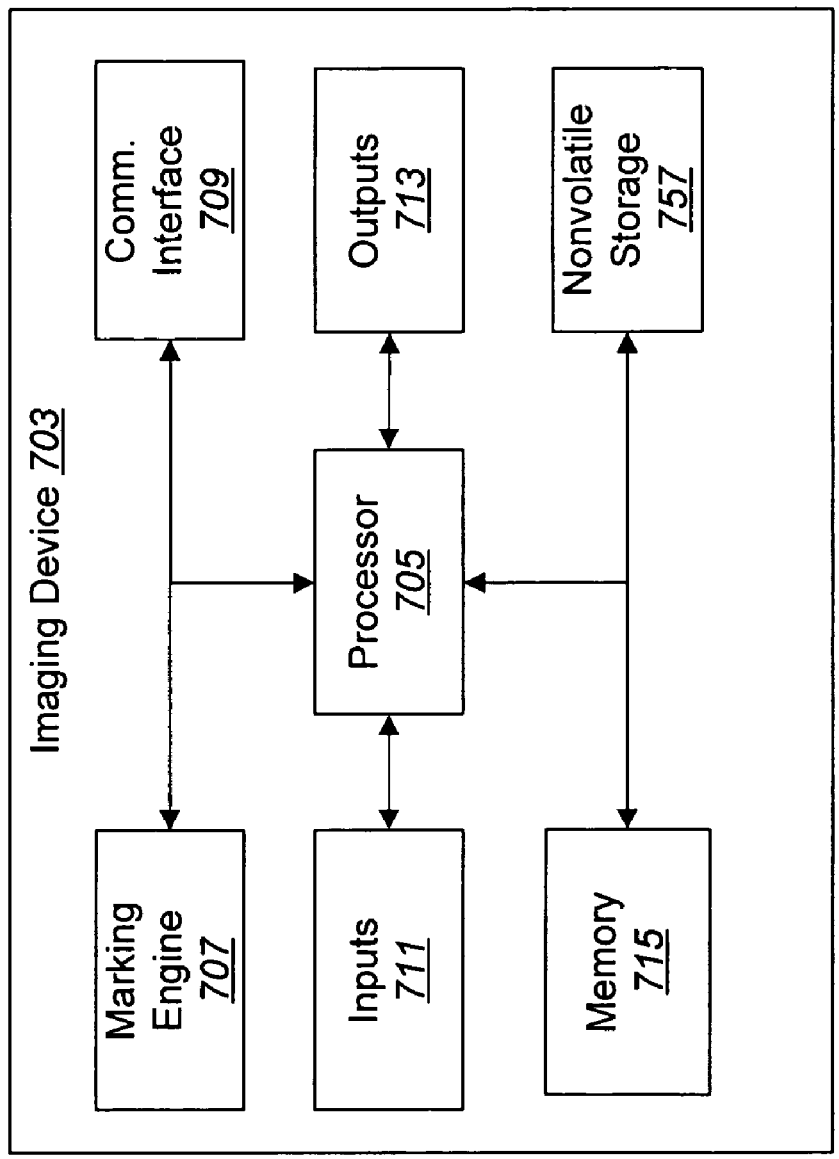
FIG. 7 is a block diagram illustrating the major hardware components typically utilized with embodiments of an imaging device.

FIG. 7 is a block diagram illustrating the major hardware components typically utilized with embodiments of an imaging device 703. As noted above, an imaging device 703 is a device that receives image data and generates an image. Imaging devices 703 include, but are not limited to, a multi-function peripheral ("MFP") (e.g., printer/copier/scanner or a printer/copier/fax machine), a printer, a copier, a fax machine, a plotter, a computer monitor, an electronic whiteboard, etc. The imaging device 703 may be a single or a plural grouping (e.g., pool or cluster) of two or more devices.

An imaging device 703 typically includes a processor 705 in electronic communication with the various components of the imaging device 703. The processor 705 controls the operation of the imaging device 703 and may be embodied as a microprocessor, a microcontroller, a digital signal processor (DSP) or other device known in the art. The processor 705 typically performs logical and arithmetic operations based on program instructions stored within the memory 715.

The imaging device 703 may also include a marking engine 707 in communication with the processor 705. The marking engine comprises the systems and components for creating an image based on received image data. For example, if the imaging device is a printer (e.g., an inkjet, thermal dye sublimation, or laser printer) or a fax machine, the marking engine comprises those components used to mark paper with the image specified by the image data. If the imaging device is a display device, the marking engine comprises those components used to display the image on the screen, in contrast to those components used to process the data received by the display screen.

The processor 705 may also be in electronic communication with a communication interface 709. The communication interface 709 may be used for communications with computing devices, servers, other imaging devices, etc. Thus, the communication interface 709 of the device 703 may be designed to send signals or messages between the computing devices (e.g., 401 of FIG. 4). The communication interface 709 may be based on wired communication technology, wireless communication technology, or both. Examples of different types of communication interfaces 709 include a serial port, a parallel port, USB, an Ethernet adapter, an IEEE 1394 bus interface, a small computer system (SCSI) bus interface, an infrared (IrDA) communication port, a Bluetooth wireless communication adapter, and so forth.

The processor 705 may operably be connected to various input 711 and/or output devices 713 capable of electronic communication with the processor 705, or, in other words, with devices capable of input and/or output in the form of an electrical signal. Embodiments of imaging devices 703 may include the inputs 711, outputs 713 and processor 705 within the same physical structure or in separate housings or structures. Examples of different kinds of input devices 711 include a keypad, keyboard, mouse, microphone, remote control device, button, joystick, trackball, touchpad, touchscreen, lightpen, etc. Examples of different kinds of output devices 713 include an LCD screen displaying the status or selected features of the imaging device 703 and a speaker.

The imaging device 703 may also include memory 715. The memory 715 may be a separate component from the processor 705, or it may be on-board memory 715 integrated with the processor 705. For example, microcontrollers often include a certain amount of on-board memory. As used herein, the term "memory" 715 is broadly defined as any electronic volatile storage medium, such as RAM. The memory 715 typically may be read and written to very rapidly, when compared to nonvolatile storage devices. The memory 715 typically stores program instructions and other types of data. The program instructions may be executed by the processor 705 to implement some or all of the methods disclosed herein. The memory 715 may also be used as a queue (e.g., 353 of FIG. 3) in which to store incoming image data received by the imaging device 703.

The imaging device may also include a nonvolatile storage device 757, such as a hard disk storage device or a flash memory storage device. The nonvolatile storage device 757 stores data that is retained even if the imaging device 703 is turned off or otherwise loses power. The nonvolatile storage device 757 may include a plurality of physically discrete storage devices. The nonvolatile storage device 757 typically operates at read/write speeds much slower than the memory 715.

Figure 8:
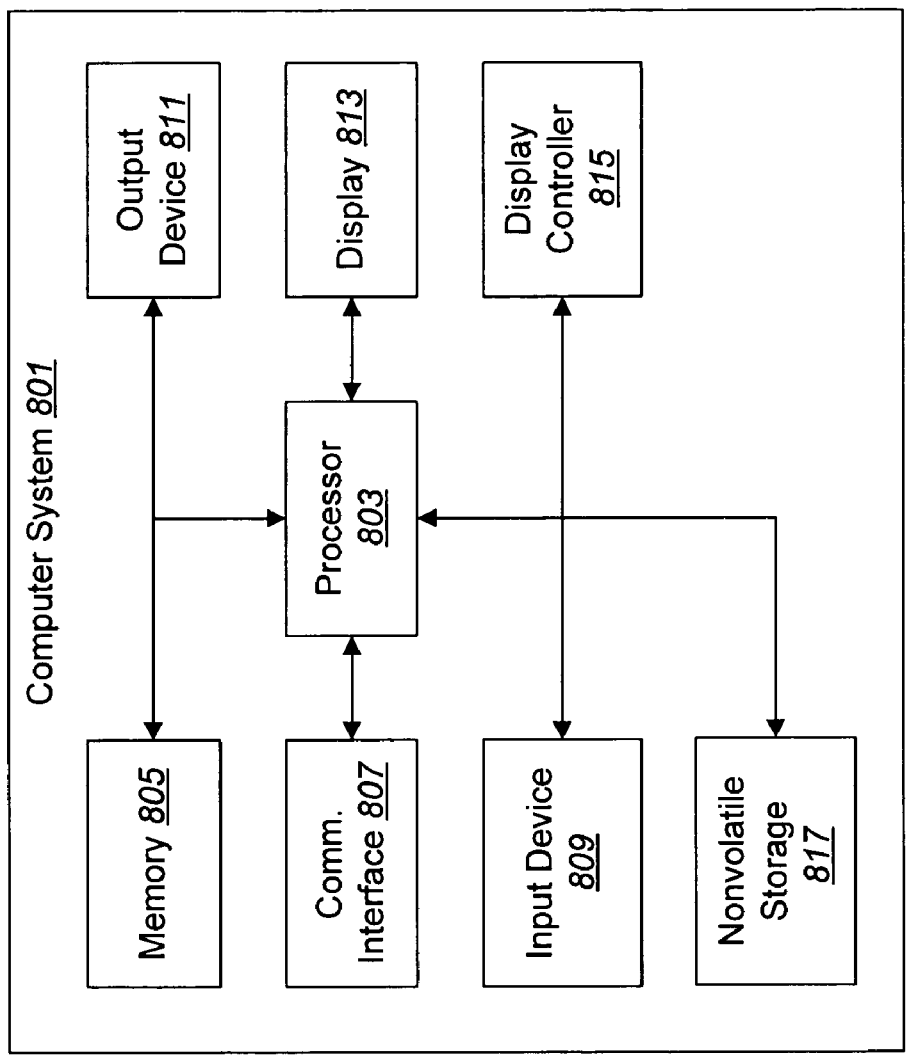
FIG. 8 is a block diagram illustrating the major hardware components typically utilized in a computer system.

FIG. 8 is a block diagram illustrating the major hardware components typically utilized in a computer, or client, system 801. These typical components may also be used in connection with a server (e.g., 302). The illustrated components may be located within the same physical structure or in separate housings or structures.

The computer system 801 includes a processor 803 and memory 805. The processor 803 controls the operation of the computer system 801 and may be embodied as a microprocessor, a microcontroller, a digital signal processor (DSP) or other device known in the art. The processor 803 typically performs logical and arithmetic operations based on program instructions stored within the memory 805.

As used herein, the term "memory" 805 is broadly defined as any electronic volatile storage medium, such as RAM. The memory 805 typically may be read and written to very rapidly, when compared to nonvolatile storage devices. The memory 805 typically stores program instructions and other types of data. The program instructions may be executed by the processor 803 to implement some or all of the methods disclosed herein.

The computer system 801 typically also includes one or more communication interfaces 807 for communicating with other electronic devices. The communication interfaces 807 may be based on wired communication technology, wireless communication technology, or both. Examples of different types of communication interfaces 807 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 801 typically also includes one or more input devices 809 and one or more output devices 811. Examples of different kinds of input devices 809 include a keyboard, mouse, microphone, remote control device, button, joystick, trackball, touchpad, lightpen, etc. Examples of different kinds of output devices 811 include a speaker, printer, etc. One specific type of output device that is typically included in a computer system is a display device 813. Display devices 813 used with embodiments disclosed herein may utilize any suitable image projection technology, such as a cathode ray tube (CRT), liquid crystal display (LCD), light-emitting diode (LED), gas plasma, electroluminescence, or the like. A display controller 815 may also be provided, for converting data stored in the memory 805 into text, graphics, and/or moving images (as appropriate) shown on the display device 813.

The computer system 801 may also include a nonvolatile storage device 817, such as a hard disk storage device. The nonvolatile storage devices 817 may also be embodied in other ways, such as flash memory. The nonvolatile storage device 817 retains the data stored therein after power is turned off or otherwise lost. As noted above, nonvolatile storage devices 817 generally have slower read/write speeds than volatile memory.

Of course, FIG. 8 illustrates only one possible configuration of a computer system 801. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for creating an image from a document, comprising:
    receiving image data derived from a document at an imaging device;
    determining whether any portion of the image data is in an image-ready format that can be directly processed by a marking engine, wherein the determining is performed immediately after the image data is received;
    if there is a portion of the image data that is not in an image-ready format, converting that portion of the image data to an image-ready format immediately after determining that the portion of the image data is not in an image-ready format; and
    transmitting the image data in an image-ready format to the marking engine within the imaging device for creation of an image, wherein if the image data is spooled to a nonvolatile storage device at the imaging device, the image data is transmitted to the marking engine before spooling the image data at the imaging device in an image-ready format to the nonvolatile storage device at the imaging device such that the image data is transmitted to the marking engine without a delay by a read/write process of the nonvolatile storage device, wherein once the image data is in an image-ready format, no conversion of the image data occurs before the image data is transmitted to the marking engine or spooled to the nonvolatile storage device.

2. The method of claim 1, further comprising storing the image data in a queue comprising volatile memory following receipt of the image data at the imaging device.

3. The method of claim 1, further comprising following or concurrent with transmission of the image data to the marking engine, spooling the image data on the nonvolatile storage device.

4. The method of claim 1, wherein the image-ready format is a rasterized format, and wherein a page description language (PDL) format is not an image-ready format.

5. The method of claim 4, wherein the received image data is in a PDL format.

6. The method of claim 5, wherein the PDL format is a postscript format.

7. The method of claim 4, wherein received image data is in the rasterized format, and wherein the image data was rasterized by a raster image processor (RIP) server.

8. The method of claim 1, wherein the imaging of the first page of the document is not delayed by a read/write process of the nonvolatile storage.

9. The method of claim 1, wherein the image data is transmitted to the nonvolatile storage after imaging data has been imaged by the marking engine.

10. An imaging device that is configured for creating an image from a document, the imaging device comprising:
    a processor;
    memory in electronic communication with the processor;
    a nonvolatile storage device in communication with the processor;
    a marking engine in communication with the processor;
    instructions stored in the memory, the instructions being executable to:
        receive image data derived from a document;
        determine whether any portion of the image data is in an image-ready format that can be directly processed by a marking engine, wherein the determining is performed immediately after the image data is received;
        if there is a portion of the image data is not in an image-ready format, convert that portion of the image data to an image-ready format immediately after determining that the portion of the image data is not in an image-ready format; and
        transmit the image data in an image-ready format to the marking engine for creation of an image, wherein if the image data is spooled to a nonvolatile storage device at the imaging device, the image data is transmitted to the marking engine before spooling the image data at the imaging device in an image-ready format to the nonvolatile storage device at the imaging device such that the image data is transmitted to the marking engine without a delay by a read/write process of the nonvolatile storage device, wherein once the image data is in an image-ready format, no conversion of the image data occurs before the image data is transmitted to the marking engine or spooled to the nonvolatile storage device.

11. The imaging device of claim 10, further comprising a queue including volatile memory, wherein the queue stores image data following receipt of the image data at the imaging device.

12. The imaging device of claim 10, wherein the instructions are further executable to spool the image data on the nonvolatile storage device following or concurrent with transmission of the image data to the marking engine.

13. The imaging device of claim 10, wherein the image-ready format is a rasterized format, and wherein a page description language (PDL) format is not an image-ready format.

14. The imaging device of claim 13, wherein the received image data is in a PDL format.

15. The imaging device of claim 14, wherein the PDL format is a postscript format.

16. The imaging device of claim 13, wherein received image data is in the rasterized format, and wherein the image data was rasterized by a raster image processor (RIP) server.

17. An imaging device that is configured for creating an image from a document, the imaging device comprising:
    a processor;
    memory in electronic communication with the processor;
    a hard disk storage device in communication with the processor;
    a marking engine in communication with the processor;
    instructions stored in the memory, the instructions being executable to:
        receive image data derived from a document;
        determine whether any portion of the image data is in a rasterized format, wherein the determining is performed immediately after the image data is received;
        if there is a portion of the image data has not been rasterized, convert that portion of the image the image data to image data in a rasterized format immediately after determining that the portion of the image data is not in a rasterized format; and
        transmit the image data in an image-ready format to the marking engine for creation of an image, wherein if the image data is spooled to the hard disk storage device at the imaging device, the image data is transmitted to the marking engine before spooling the image data at the imaging device in an image-ready format to the hard disk storage device at the imaging device such that the image data is transmitted to the marking engine without a delay by a read/write process of the hard disk storage device, wherein once the image data is in an image-ready format, no conversion of the image data occurs before the image data is transmitted to the marking engine or spooled to the hard disk storage device.

18. The imaging device of claim 17, further comprising a queue including volatile memory, wherein the queue stores image data following receipt of the image data at the imaging device.

19. The imaging device of claim 17, wherein the instructions are further executable to spool the image data on the hard disk storage device following or concurrent with transmission of the image data to the marking engine.

20. The imaging device of claim 19, wherein the PDL format is a postscript format.

21. The imaging device of claim 17, wherein the image data received at the imaging device is in a PDL format.

22. The imaging device of claim 17, wherein the image data received at the imaging device is in a rasterized format, and the image data was rasterized by a RIP server.

* * * * *